UNITED STATES PATENT OFFICE.

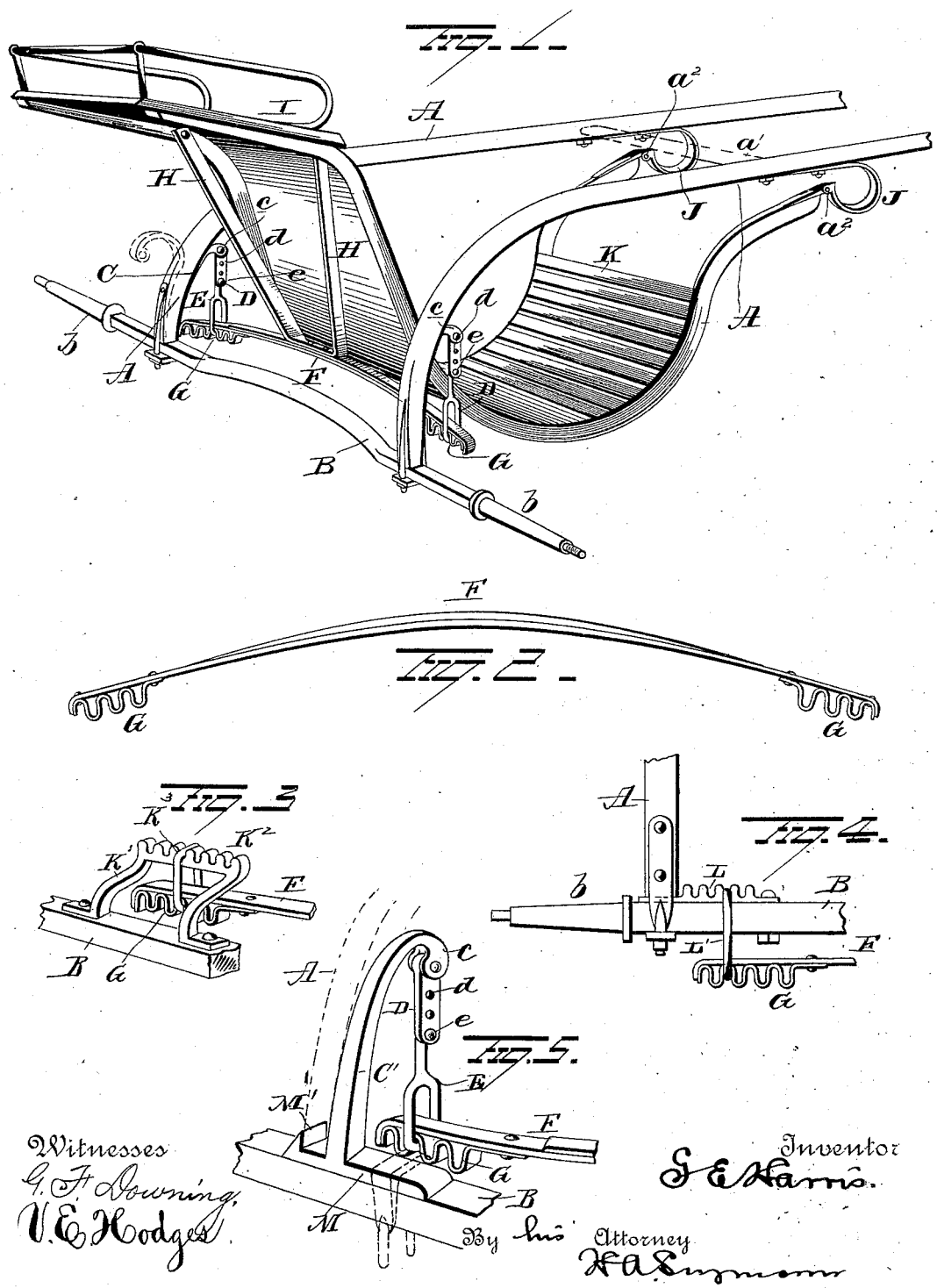

GEORGE ERWIN HARRIS, OF LAWRENCEVILLE, PENNSYLVANIA.

VEHICLE-SPRING.

SPECIFICATION forming part of Letters Patent No. 401,495, dated April 16, 1889.

Application filed January 12, 1889. Serial No. 296,120. (No model.)

*To all whom it may concern:*

Be it known that I, GEORGE ERWIN HARRIS, of Lawrenceville, in the county of Tioga and State of Pennsylvania, have invented certain new and useful Improvements in Vehicle-Springs; and I do hereby declare the following to be a full, clear, and exact description of the invention, such as will enable others skilled in the art to which it appertains to make and use the same.

My invention relates to vehicles, and more particularly to a novel arrangement of springs, and has for its object to provide a vehicle-spring having adjusting devices at its ends for the purpose of stiffening and strengthening the spring according to the weight put upon it.

A further object is to provide a vehicle-spring having a vertical as well as a lateral adjustment at its ends.

A further object is to so connect the spring to the body of the vehicle that its vertical adjustment will effect the adjustment of the vehicle-seat.

A further object is to connect the forward end of the body of a two-wheeled vehicle to the shafts, cross-bars, or other suitable device in such a manner, by means of springs, that said body will readily adjust itself to irregularities of the road.

A further object is to so close a portion, which has heretofore been left open, of a two-wheeled vehicle-body as to prevent the exposure of limbs and feet of the occupants.

A further object is to produce a vehicle which shall be simple in construction, pleasing in appearance, and effective in operation.

With these objects in view my invention consists in certain novel features of construction and peculiar combinations and arrangements of parts, as will be hereinafter set forth, and pointed out in the claims.

In the accompanying drawings, Figure 1 is a perspective view of a two-wheeled vehicle embodying my invention. Fig. 2 is a separate view of the spring. Figs. 3, 4, and 5 are views of modifications.

A indicates the shafts of a vehicle, curved downwardly at their rear ends and clipped or otherwise secured to an axle, B, which latter is preferably curved inwardly or upwardly at its center and having the skeins $b$ projecting from the ends.

Upwardly-extending shaft-irons C are secured to the shafts A at the inner or rear ends of the latter, and curved outwardly therefrom at their upper ends to produce hooks or loops $c$, for the reception of downwardly-extending oscillating plates D, having a series of perforations, $d$, in line with the vertical axis of said plates. Stirrups E, provided with hooked upper ends $e$, are adapted to connect with and be suspended from the plates D, the hooks $e$ entering one of the series of perforations in said plates. The ends of a semi-elliptical spring, F, pass through the loops of the stirrups and are adapted to be supported thereby. Secured to or made integral with the spring F at its ends, and extending inwardly from said ends, are notched plates or similar devices, G, in a notch of each of which the stirrups E are adapted to fit, thus providing means whereby the spring may be supported from the stirrups at different distances from the center of the spring. It will be seen that by this means of adjustment the spring may be stiffened by inserting the stirrup in the notches or other suitable device nearest the center of the spring, and thus adapt the vehicle for heavy loads; or said spring may be made more flexible by suspending the spring from the stirrups nearer the extremities of the former, and thereby adapt the vehicle for lighter loads.

If desired, the shaft-irons C, which support the stirrups E, may be made to project rearwardly of the axle, as shown in dotted lines, Fig. 1, and thus suspend the spring F in rear of the axle B, instead of in advance thereof, as shown in said figure.

Secured to the spring F, at or near its center, and projecting upwardly and slightly outwardly therefrom, are two spring-jacks or body-supports, H, which connect at their upper ends with the side bars of the body or seat I, either with or without a hinge or flexible connection, immediately under the seat I', which is arranged at the upper termination of the body. The side bars curve downwardly from the seat I, and then upwardly and outwardly, terminating at their forward ends with an eye or perforation and near the under surface of the shafts A somewhat in advance of the curved portion of the same.

Secured to the shafts A, or to the cross-bars $a'$, or any other suitable device above the forward termination of the side bars, are C-shaped springs J with projecting ears at their free ends with perforations therein to receive a bolt, $a^2$, the ends of the side bars being placed between the ears and the bolt inserted therein couples together the springs J and the side bars of the body. By thus attaching the forward end of the body to the shafts, or to the cross-bars $a'$, or other suitable device, a side-swinging motion is permitted to the seat and body, the motion of the horse will be compensated for, shocks caused by conflict with obstructions in the roadway will be taken up, and the pounding or whipping of the horse by the forward ends of the shafts will be obviated and the wheels greatly relieved from sudden shocks and strain. The forward portion of the side bars will preferably be connected by slats K, of wood or other suitable material, while the portion of said bars in rear of the slats is united by means of sheet metal or wood, which portion has heretofore been left open. By thus providing a decking of wood or sheet metal the limbs and feet of the occupants will be protected from exposure.

It is evident that the spring F may be attached to the vehicle in other ways than by suspending it from the shaft-irons, as previously explained, without departing from the spirit of my invention, the essential feature being to provide support for the spring capable of being adjusted toward and away from its connection with the vehicle.

In the form of my invention shown in Fig. 3 the axle has secured to its upper side near each end a bracket, K', having a notched transverse bar, $K^2$, at its top, the arms of said bracket curving slightly forward or rearward in order that the spring connected thereto may clear the axle. The ends of the spring F are suspended beneath the notched transverse bar of the brackets K', and said notched bar and the notched plates or other suitable devices of the spring connected by a loop or link, $K^3$; or, if preferred, notched plates L may be secured directly to the top face of the axle near its ends, as shown in Fig. 4, the spring F in such case extending beneath the axle and connected with the notched plate L by a loop or link, L'. In this case the central portion of the axle B may be curved either forwardly or rearwardly, so as to allow the spring-jacks or body-supports, which connect the spring and body, free movement without coming in contact with said axle.

If desired, the upwardly-extending arms C', which lie close to and parallel with the shafts throughout the greater portion of their length, may be provided at their base with an integral shoe, M, adapted to be clipped or otherwise secured to the axle B, as shown in Fig. 5. The outer portion of each shoe M is provided with two upwardly-projecting flanges, M', between which the ends of the shafts are seated.

Many slight changes might be made in the constructive details of my invention without departing from the spirit thereof; hence I do not wish to limit myself to the precise details of construction herein described; but, Having fully described my invention, what I claim as new, and desire to secure by Letters Patent, is—

1. In a two-wheel vehicle, the combination, with a body and an axle, of a spring attached to the body and supports for the ends of the springs, the said supports being adjustable toward and away from the center of the spring, substantially as set forth.

2. In a two-wheel vehicle, the combination, with a body and a carrying-frame composed of an axle and shafts secured thereto, of loops suspended from said frame and forming supports for the free ends of the spring, the said loops being adjustable toward and away from the center of the spring, substantially as set forth.

3. In a vehicle, the combination, with a body and a carrying-frame composed of an axle, and shafts secured thereto, of a spring secured at its center to the body and provided at each end with a series of notches and swinging loops suspended from the carrying-frame and supporting the ends of the spring, the said loops being adjustable toward and away from the ends of the spring, substantially as set forth.

4. In a vehicle, the combination, with the shafts and shaft-irons secured thereto, of a stirrup adjustably secured to the latter and a spring adjustably connected with the stirrup, substantially as set forth.

5. The combination, with a body and a carrying-frame composed of an axle and shafts secured thereto, of vertically-adjustable loops suspended from said carrying-frame and supporting the spring, the said loops being adjustable toward and away from the center of said spring, substantially as set forth.

6. In a vehicle, the combination, with the shafts, of curved shaft-irons secured thereto, perforated plates attached to the shaft-irons so as to oscillate, stirrups adjustably connected to said plates, and a spring adjustably attached to the stirrups, substantially as set forth.

7. The combination, with a body and a semi-elliptic spring secured thereto and provided at each end with a series of bearings, of suspended loops supporting the ends of the spring and adjustable toward and away from the center thereof, substantially as set forth.

8. In a vehicle, the combination, with a body and a carrying-frame composed of an axle and shafts, of springs connecting the front end of the body to the shafts, a semi-elliptic spring secured to the under side of the body, and loops suspended from the carrying-frame and supporting the ends of the semi-elliptic spring, the said loops adapted to be adjusted toward and away from the center of the spring, substantially as set forth.

9. In a vehicle, the combination, with the shafts, of stirrups supported thereby, a spring supported by said stirrups, notched plates on said spring to receive the stirrups, spring-jacks or body-supports secured to said spring, and a body supported at one end on said spring-jacks or body-supports and at the other end by the shafts or cross-bars, substantially as set forth.

In testimony whereof I have signed this specification in the presence of two subscribing witnesses.

GEORGE ERWIN HARRIS.

Witnesses:
  A. M. LOOP,
  A. M. HARRIS.